July 12, 1938.   P. F. BERRY   2,123,764
FASTENING DEVICE
Filed Sept. 11, 1937   2 Sheets-Sheet 1
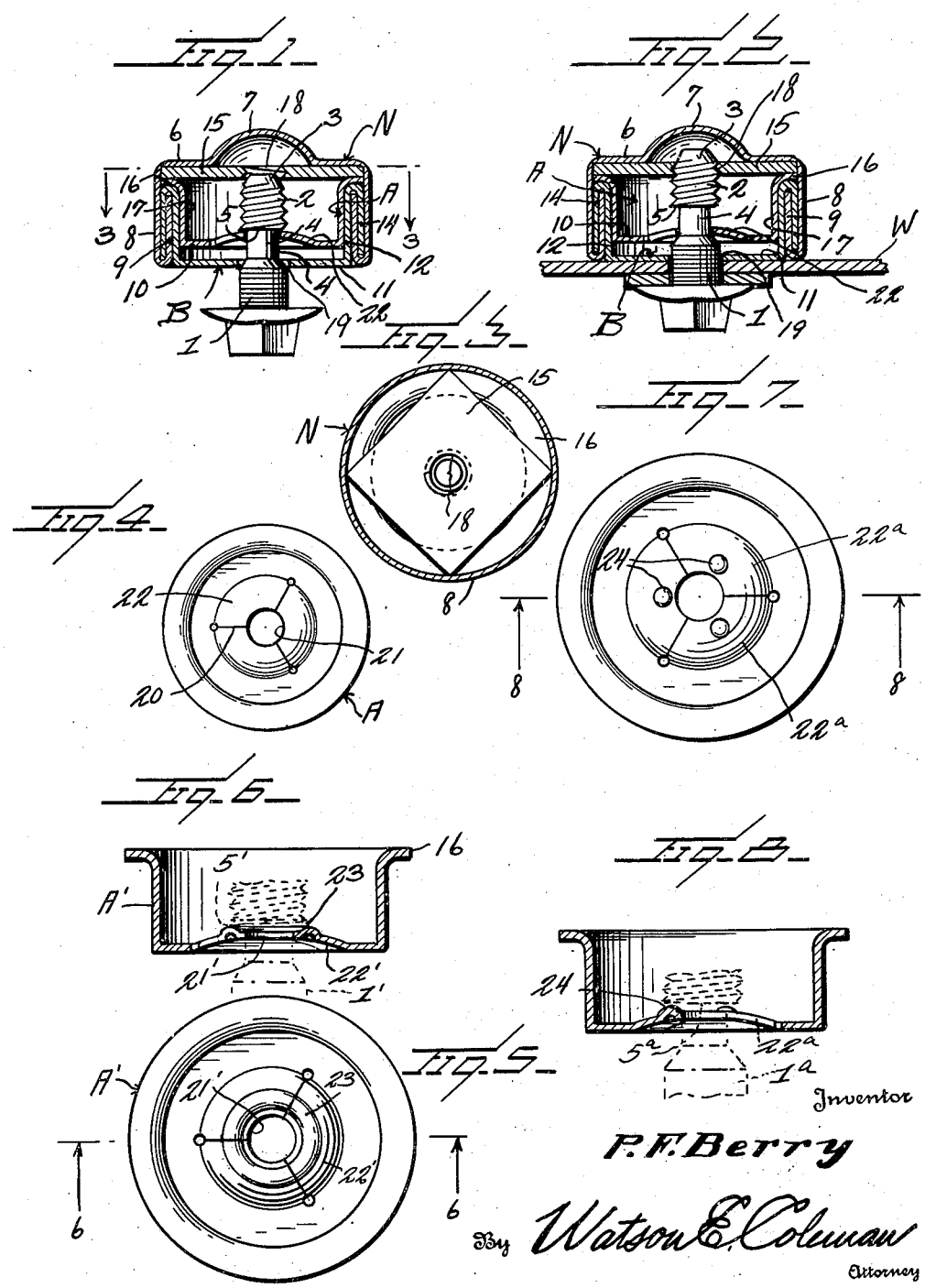

July 12, 1938.   P. F. BERRY   2,123,764
FASTENING DEVICE
Filed Sept. 11, 1937   2 Sheets-Sheet 2
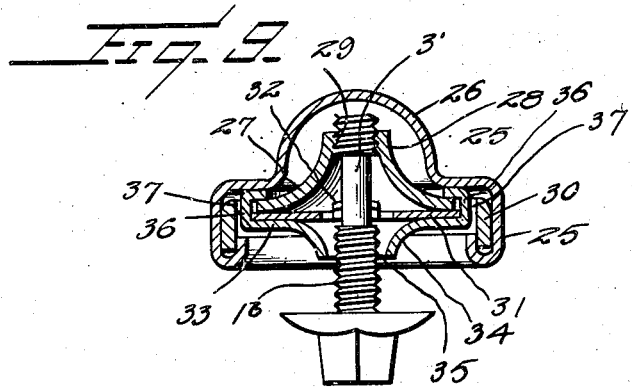
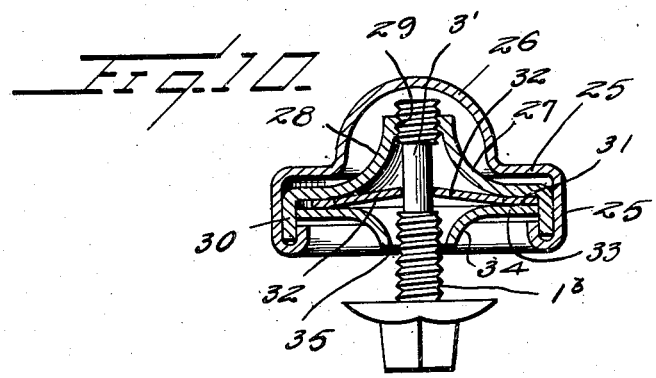
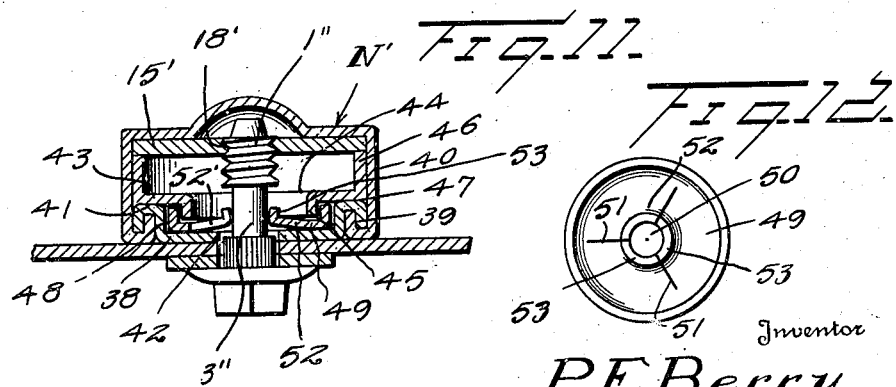
Inventor
P. F. Berry
By Watson E. Coleman
Attorney Patented July 12, 1938

2,123,764

UNITED STATES PATENT OFFICE 2,123,764

FASTENING DEVICE

Paul F. Berry, Columbus, Ohio

Application September 11, 1937, Serial No. 163,491

12 Claims. (Cl. 85—32)

This invention relates to fastening devices, and it is primarily an object of the invention to provide such a device including a bolt and a grip nut therefor and wherein said bolt and nut comprise means to allow the bolt and nut to be readily and quickly applied to the work but which can only be removed upon destruction.

The invention consists in the details of construction and in the combination and arrangement of the several parts of my improved fastening device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation of a fastening device constructed in accordance with an embodiment of my invention with the bolt and nut initially applied;

Figure 2 is a view similar to Figure 1 showing the nut and bolt in clamping engagement upon its work;

Figure 3 is a horizontal sectional view taken substantially on the line 3—3 of Figure 1 looking in the direction of the arrow;

Figure 4 is a view in top plan of the member herein embodied carrying the bolt engaging means unapplied;

Figure 5 is a view similar to Figure 4 but on an enlarged scale illustrating such a member constructed in accordance with another embodiment of my invention;

Figure 6 is a sectional view taken substantially on the line 6—6 of Figure 5 with an associated bolt diagrammatically indicated by broken lines;

Figure 7 is a view similar to Figure 5 illustrating a still further embodiment of a member carrying the bolt engaging means;

Figure 8 is a sectional view taken substantially on the line 8—8 of Figure 7 with an associated bolt diagrammatically indicated by broken lines;

Figure 9 is a sectional view illustrating a fastening device constructed in accordance with another embodiment of my invention;

Figure 10 is another sectional view of the device as illustrated in Figure 9, the line of section being at right angles to the line of section in Figure 9;

Figure 11 is a sectional view illustrating a still further embodiment of my invention;

Figure 12 is a view in plan of the rotating plate as comprised in Figure 11.

As illustrated in Figures 1 to 8 of the accompanying drawings, 1 denotes the shank of a bolt having its outer end portion provided with the peripheral threads 2 and terminating in a tapered portion or point 3. The threads 2 extend to a surrounding annular groove or channel 4, the base of which is smooth and unobstructed. This groove or channel 4 provides an annular shoulder 5 at the inner end of the threaded portion 2 of the shank 1.

The nut N comprises an outer shell of a general cup-like formation comprising a body plate or portion 6, the central part of which is formed to provide an outstanding dome 7. The margin of the body plate or portion 6 is defined by a surrounding flange 8 of a material length so that the outer portion thereof may be returned to provide a reverted flange 9 extending inwardly of the shell and spaced from the flange 8.

A cup-like member A is snugly nested within a second cup-like member B with the base wall or plate 10 of the member A spaced from the base wall 11 of the member B.

The side wall or flange 12 of the member B is of a material length so that it can be returned to provide a reverted flange 14 to snugly engage between the side wall or flange 8 and the reverted flange 9 of the shell whereby the members A and B will be snugly and rigidly held within the shell.

However, before the desired operation of interlocking the shell and the member B is accomplished, a nut 15 has its corner portions, as illustrated in Figure 3, rested upon the outwardly flared lip 16 defining the upper or free marginal portion of the side wall or flange 17 of the member A and lapping the connected portions of the wall or flange 12 and the flange 14 of the member A. After this initial assembly has been made the same is subjected to required pressure which will result in desired clamping of the several parts in assembled relation with the corner portions of the nut 15 slightly penetrating the body plate or portion 6 of the shell whereby said nut 15 is effectively held against rotation independently of the shell.

The nut 15 is initially formed with a centrally arranged threaded opening 18 which aligns with an initially formed opening 19 in the base wall 11 of the member B. The central portion of the base wall 10 of the member A is concavo convex with the concave face disposed toward the nut 15. This concavo convex portion of the base wall 10 of the member A has disposed thereacross the slits 20 radial to an opening 21 at the center of such concavo convex portion. These slits 20 divide such concavo convex portion into a plurality of lugs 22 disclosed in Figure 4 as three in number. The opening 21 is of a diameter less than the major diameter of the shank 1 but slightly in excess of the diameter of the groove or channel 4.

It is to be noted that the threaded portion 2 at the free extremity of the shank 1 is of a length less than the distance between the central part of the base wall or flange 10 of the member A and the applied nut 15 but that the width of the groove or channel 4 is such as to permit the threaded portion 2 to engage within the threaded opening 18 of the nut 15 as is illustrated in Figure 2.

After the shank 1 has been disposed through the work W the nut N may be readily applied to the shank as the lugs, or pawls as they may be termed, will readily yield to permit the threaded portion 2 to pass through the central opening 21. After such portion 2 has been passed through the opening the inherent resiliency of the lugs or pawls 22 will cause the same to engage within the groove or channel 4 for coaction with the shoulder 5 whereby separation of the nut N and the shank 1 is permitted. This groove or channel 4 is of a width sufficient to permit the threaded portion 2 of the shank 1 to thread within the opening 18 of the nut 15 to allow for the desired fine adjustment of the nut N upon the shank 1 for effective coaction with the work W, such work for example being a license plate for an automobile.

The construction and formation of the lugs or pawls 22 is such that upon withdrawal action of the shank 1 the contact of the shoulder 5 with the extremities of the lugs or pawls 22 will build up sufficient pressure against the lugs or pawls 22 to cause the shank 1 to break at its weakest point which is the reduced portion of the shank provided by the annular groove or channel 4. Upon such breakage the inner separated threaded portion 2 cannot be removed except upon complete destruction of the nut N. This is of importance as it will eliminate the substitution of another shank should the shank initially engaged with the nut be deliberately broken.

In the embodiment of my invention as illustrated in Figures 5 and 6, the member A' has the free extremities of the lugs or pawls 22' provided with the beads 23. These beads 23 substantially define the central opening 21' and are disposed in a direction for contact with the shoulder 5' of the shank 1' as indicated by broken lines in Figure 6. These beads 23 provide a positive means to prevent the extremities of any one of the lugs or pawls 22' engaging the threaded portion 2' which might make it possible under certain conditions to effect a complete withdrawal of the shank. In other words, these beads 23 may be employed as a precautionary medium to prevent curling or breaking down of the free end portions of the lugs or pawls 22' because with the threads 2' of the shank 1' free from the nut 15 pull upon the shank 1' will bring the shoulder 4 into contact with the beads 23 which, as is clearly illustrated in Figure 6, are positioned slightly inwardly of the outer ends of the lugs or pawls 22'. This contact effectively prevents the tips or free ends of the lugs or pawls 22' being received within the threads 2' but, on the contrary, such pull upon the shank 1' will cause such ends of the lugs or pawls 22' to flex away from the threads 2'.

In the embodiment of the invention as illustrated in Figures 7 and 8, the lugs or pawls 22ᵃ adjacent to their outer or free ends are provided with the outstanding knobs or protuberances 24 for coaction with the shoulder 5ᵃ of the shank 1ᵃ for the same purposes as hereinbefore set forth with respect to the beads 23.

In the embodiment of my invention as illustrated in Figures 9 and 10 of the drawings, the nut comprises an outer shell 25 also of a general cup-like formation and which is provided, as in the previous embodiments, with a central outstanding dome 26. This shell 25 also includes a marginal flange 25' of a material length.

Snugly fitting within the shell 25 is an inner plate 27 having its central portion extended to provide an outstanding truncated cone 28, the outer end of which is open and internally threaded, as at 29. The marginal portion of the plate 27 is defined by an annular flange 30 having close contact with the inner face of the flange 25'. The truncated portion 28 as indicated in the accompanying drawings, is substantially hollow.

A tempered plate 31 fits substantially snug within the field defined by the flange 30 of the plate 27 and is provided with inwardly disposed and opposed lugs 32 struck from the central portion of the plate. These lugs are so constructed and arranged to serve as spring pawls to permit a quick insertion of the shank 1ᵇ, but the extremities of the lugs 32 are spaced apart to permit said lugs, owing to their inherent resiliency, to engage within the groove or channel 3' produced in the periphery of the shank 1ᵇ and extending entirely therearound to allow for the proper relative adjustment of the shank 1ᵇ to the nut with respect to the work with which it is used and also to permit the outer threaded end portion of the shank 1ᵇ to be properly engaged with the threaded portion 29 of the plate 27.

Disposed over the outer face of the applied plate 31 is a plate 33 having its central part pressed out to provide a truncated portion 34 surrounding a central opening 35. The truncated portion 34 is disposed in a direction from the applied plate 31 or in a direction opposite from that of the truncated portion 28 of the plate 27. The opening 35 is of a diameter to permit ready insertion of the shank 1ᵇ therethrough. The plate 33 is provided with diametrically opposed lugs 36 which pass through suitably provided openings 37 in the marginal portion of the plate 27 at a point outwardly of but immediately adjacent to the applied plate 31 to maintain the several plates in assembled relation. As is illustrated in Figure 9, the free end portions of the lugs 36 are clinched over and inwardly upon the plate 27.

It is also to be noted that the flange 25' of the shell 25 is of such length that the free marginal portion thereof may be returned under suitably provided pressure to snugly overlap from within the flange 30 to assure desired assembly of the various parts of the nut.

In the embodiment of the invention as particularly illustrated in Figure 11, the shell N' is substantially the same as illustrated in Figures 1 and 2 of the drawings and closing the open face of the shell N' is a plate 38 the marginal portion of which interlocking, as at 39, with the side flange 40 of the shell N' in a manner to provide an internal shoulder 41. This plate 38 has a central opening 42 through which the shank 1'' is free to pass so that the outer threaded portion of the shell may properly engage within the threaded opening 18' in the nut 15'. This nut 15' is preferably applied within the shell in the same manner as hereinbefore set forth with respect to the nut 15.

Resting upon the shoulder 41 is a plate 43 having a central opening 44 defined by a depending flange 45. The peripheral margin of this plate 43 is also defined by a flange 46 disposed in a direction opposite to that of the flange 45. This flange 46 has snug contact with the inner face of the flange 40 of the nut N' and has its marginal edge contacting with the nut 15' whereby the plate 43 is effectively maintained in assembled position. The flange 45 coacts with the interlocking joint 39 to provide an annular runway 47 in which is received an upstanding marginal flange 48 carried by a plate 49. This plate 49 has a central opening 50 registering with the openings 42 and 18' and of a diameter less than the diameter of the groove or channel 3" provided in the periphery of the shank 1". This channel 3" is for the same purposes as hereinbefore set forth with respect to the other embodiment of my invention.

The tempered plate 49 is provided with the slits 51 radial to the opening 50 and in communication with such opening whereby the plate is divided into a series of lugs 52. Normally the lugs 52 are coplanar with the plate 49 but as the shank 1" is inserted within the nut said lugs 52 will be flexed toward the outer end of the shank 1". It is to be noted that the outer or free ends of these lugs 52 are defined by outstanding flanges 53 substantially at right angles to the lugs and which flanges provide effective means to prevent the lugs 52 engaging the outer threaded portion of the shank 1" which might otherwise make it possible to effect a complete withdrawal of the shank.

It is to be particularly stressed that in this embodiment of my invention the plate 49 is free to rotate or, in other words, has a swivelled mounting. This is of decided advantage as by being free to rotate the possibility is substantially eliminated of inserting instrument or tool to distort or break the tempered lugs 52 rendering them ineffective before the nut is applied.

This application is partly in continuation of my application Serial No. 60,859 filed January 25, 1936, and also of my application Serial No. 129,496 filed March 6, 1937.

From the foregoing description it is thought to be obvious that a fastening device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A fastening device comprising, in combination, a threaded shank and nut into which the shank is freely insertable by direct endwise movement with respect to the shank, said nut and shank having coacting locking means to permit the insertion of the shank into the nut but holding the shank against complete withdrawal from within the nut, said shank being constructed and arranged to allow for further endwise movement inwardly of the nut after said coacting locking means has become effective, said nut having a portion independent of said coacting means into which the shank is intended to thread after the coacting locking means is in effective relation.

2. A grip nut for a threaded shank comprising a hollow member having a central opening in a face wall, a member held within the hollow member and having a threaded opening alining with the opening in the face of the hollow member, and a second member held within the hollow member between the first member and the face of the hollow member having the opening, said second named member having its central portion concavo convex with its concave face disposed toward the first member, the central part of the concavo convex portion having an opening therethrough alining with the opening in the face of the hollow member and with the threaded opening of the first member, said concavo convex portion being provided with slits radiating from the central opening therethrough to divide said concavo convex portion into lugs for coaction with the shank to which the nut is applied to prevent separation of the nut and shank.

3. The combination with a shank having an annular groove intermediate its ends with a portion outwardly of said groove threaded; of a grip nut comprising a hollow member having a central opening in a face wall, a member held within the hollow member and having a threaded opening alining with the opening in the face of the hollow member, and a second member held within the hollow member between the first member and the face of the hollow member having the opening, said second named member having its central portion concavo convex with its concave face disposed toward the first member, the central part of the concavo convex portion having an opening therethrough alining with the opening in the face of the hollow member and with the threaded opening of the first member, said concavo convex portion being provided with slits radiating from the central opening therethrough to divide said concavo convex portion into lugs to engage within the groove of the shank to hold the assembled shank and nut against complete separation, the threaded portion of the shank being of a length less than the distance between the last two members within the hollow member, the groove being of a width sufficient to allow the threaded portion of the shank to be within the threaded opening of the first member.

4. The combination with a shank having an annular groove intermediate its ends with a portion outwardly of said groove threaded; of a grip nut comprising a hollow member having a central opening in a face wall, a member held within the hollow member and having a threaded opening alining with the opening in the face of the hollow member, and a second member held within the hollow member between the first member and the face of the hollow member having the opening, said second named member having its central portion concavo convex with its concave face disposed toward the first member, the central part of the concavo convex portion having an opening therethrough alining with the opening in the face of the hollow member and with the threaded opening of the first member, said concavo convex portion being provided with slits radiating from the central opening therethrough to divide said concavo convex portion into lugs to engage within the groove of the shank to hold the assembled shank and nut against complete separation, the threaded portion of the shank being of a length less than the distance between the last two members within the hollow member, the groove being of a width sufficient to allow the threaded portion of the shank to be within the threaded opening of the first member, the extremities of the lugs being reinforced.

5. The combination with a shank having an annular groove intermediate its ends with a portion outwardly of said groove threaded; of a grip nut comprising a hollow member having a central opening in a face wall, a member held within the hollow member and having a threaded opening alining with the opening in the face of the hollow member, and a second member held within the hollow member between the first member and the face of the hollow member having the opening, said second named member having its central portion concavo convex with its concave face disposed toward the first member, the central part of the concavo convex portion having an opening therethrough alining with the opening in the face of the hollow member and with the threaded opening of the first member, said concavo convex portion being provided with slits radiating from the central opening therethrough to divide said concavo convex portion into lugs to engage within the groove of the shank to hold the assembled shank and nut against complete separation, the threaded portion of the shank being of a length less than the distance between the last two members within the hollow member, the groove being of a width sufficient to allow the threaded portion of the shank to be within the threaded opening of the first member, the extremities of the lugs being reinforced to provide means to engage the threaded portion of the shank to prevent the extremities of the lugs engaging the threads of the shank.

6. The combination with a shank having an annular groove intermediate its ends with a portion outwardly of said groove threaded; of a grip nut comprising a hollow member having a portion of one face wall open, a member within the hollow member and having a threaded opening, and a second member within the hollow member, said second member having an opening alining with the opening in the face wall of the hollow member and with the threaded opening of the first member, said second member being formed and constructed to provide lugs to engage within the groove of the shank to hold the assembled shank and nut against complete separation, said groove providing an annular shoulder surrounding the shank, the outer end portions of the lugs being provided with means for contact with said shoulder upon outward movement of the shank to prevent flexing of the lugs away from the shoulder to prevent the extremities of said lugs engaging the threads of the shank so that the shank is held against complete separation from the nut.

7. A nut for a threaded shank comprising a shell, a plate within the shell and having a threaded opening into which the shank is adapted to thread, a second plate overlying the first named plate and having resilient lugs for coaction with the shank to which the nut is applied to hold the nut and shank against separation, a third plate overlying the second plate, said first and third plates having coacting means to hold the three plates in assembled relation, and means for holding the plate assembly within the shell.

8. A fastening device comprising, in combination, a threaded shank having intermediate its ends a surrounding groove, a shell having one face open and the opposed face closed, a plate carried by and intersecting the shell, the central portion of said plate being extended toward the closed end of the shell to provide a truncated cone, the outer end portion of which is open and internally threaded, a second plate within and carried by the shell outwardly of the first plate, said second plate having means automatically engaging within the groove of the shank upon initial insertion of the shank into the shell through the open face thereof, said means when engaged within the groove of the shank holding the shank against withdrawal, said groove being of a length to allow the shank to thread within the threaded portion of the first plate after the holding means is engaged within the groove of the shank.

9. A fastening device comprising, in combination, a threaded shank having intermediate its ends a surrounding groove, a shell having one face open and the opposed face closed, a plate carried by and intersecting the shell, the central portion of said plate being extended toward the closed end of the shell to provide a truncated cone, the outer end portion of which is open and internally threaded, a second plate within and carried by the shell outwardly of the first plate, said second plate having means automatically engaging within the groove of the shank upon initial insertion of the shank into the shell through the open face thereof, said means when engaged within the groove of the shank holding the shank against withdrawal, said groove being of a length to allow the shank to thread within the threaded portion of the first plate after the holding means is engaged within the groove of the shank, said means comprising one or more resilient lugs flexing inwardly of the shell to allow the initial insertion of the shank into the shell.

10. A fastening device comprising, in combination, a shank having its outer end portion threaded, the portion of the shank immediately adjacent to said threaded portion being of decreased diameter with its periphery smooth and unobstructed, a shell having one face open and the opposed face closed, a plate carried by and intersecting the shell, the central portion of said plate having a threaded opening, a second plate within and carried by the shell outwardly of the first plate, said second plate having means automatically engaging within the reduced portion of the shank upon initial insertion of the shank into the shell through the open face thereof, said means when engaged within the reduced portion of the shank holding the shank against withdrawal, said reduced portion of the shank allowing the shank to thread into the opening of the first plate after the holding means is engaged within the reduced portion of the shank.

11. A fastening device comprising, in combination, a shank having its outer end portion threaded, the portion of the shank immediately adjacent to said threaded portion being of decreased diameter with its periphery smooth and unobstructed, a shell having one face open and the opposed face closed, a plate carried by and intersecting the shell, the central portion of said plate having a threaded opening, a second plate within and rotatably carried by the shell outwardly of the first plate, said second plate having means automatically engaging within the reduced portion of the shank upon initial insertion of the shank into the shell through the open face thereof, said means when engaged within the reduced portion of the shank holding the shank against withdrawal, said reduced portion of the shank allowing the shank to thread into the opening of the first plate after the holding means is engaged within the reduced portion of the shank.

12. A fastening device comprising, in combination, a shank having its outer end portion threaded, the portion of the shank immediately adjacent to said threaded portion being of decreased diameter with its periphery smooth and unobstructed, a shell having one face open and the opposed face closed, a plate carried by and intersecting the shell, the central portion of said plate having a threaded opening, a second plate within and freely carried by the shell outwardly of the first plate, said second plate having means automatically engaging within the reduced portion of the shank upon initial insertion of the shank into the shell through the open face thereof, said means when engaged within the reduced portion of the shank holding the shank against withdrawal, said reduced portion of the shank allowing the shank to thread into the opening of the first plate after the holding means is engaged within the reduced portion of the shank.

PAUL F. BERRY.